April 23, 1935. J. H. MOSLEY ET AL 1,998,842
ARTICLE FEEDING MECHANISM
Filed Dec. 11, 1930 2 Sheets-Sheet 2
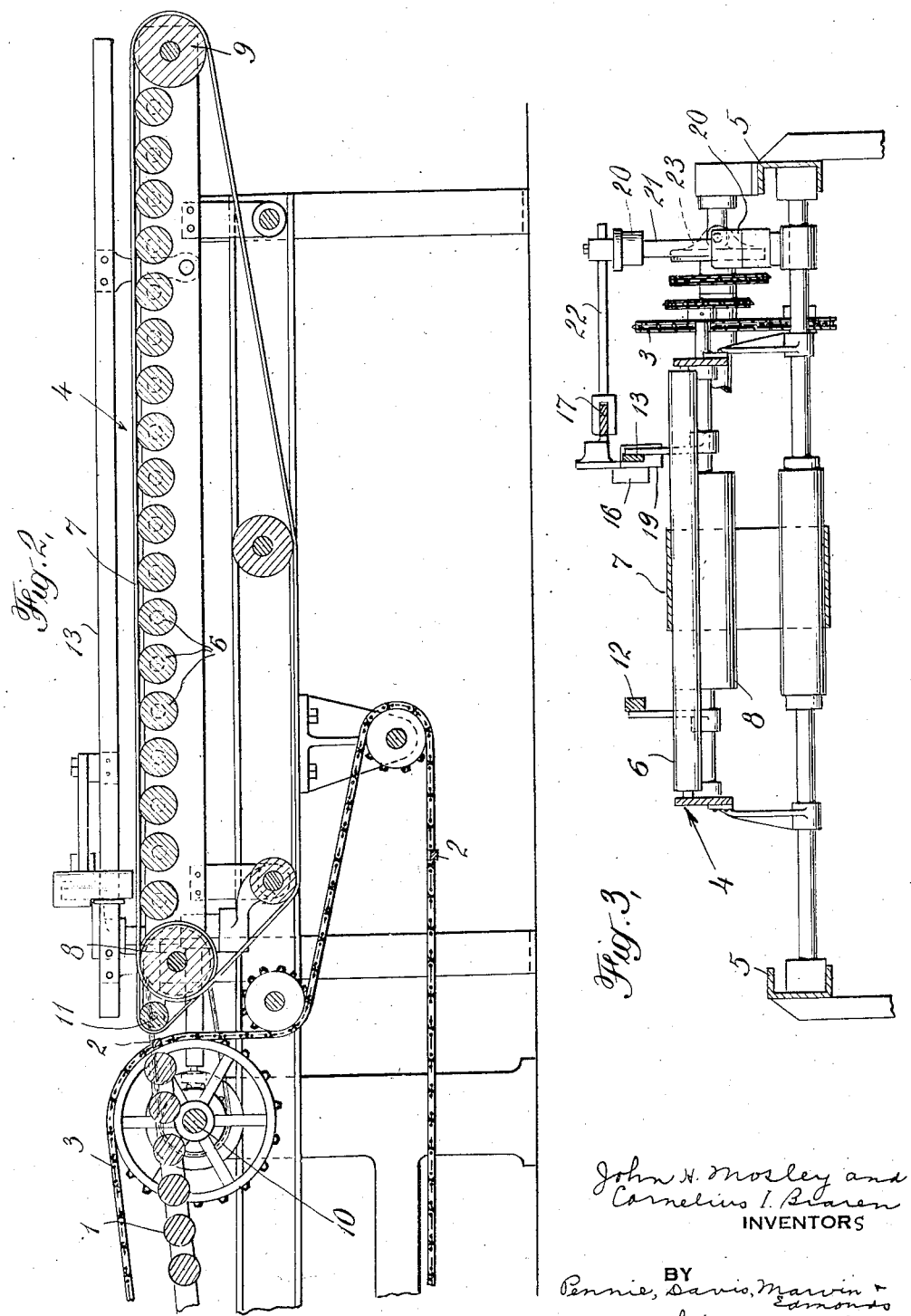
John H. Mosley and
Cornelius I. Braren
INVENTORS
BY
Pennie, Davis, Marvin & Edmonds
their ATTORNEYS Patented Apr. 23, 1935

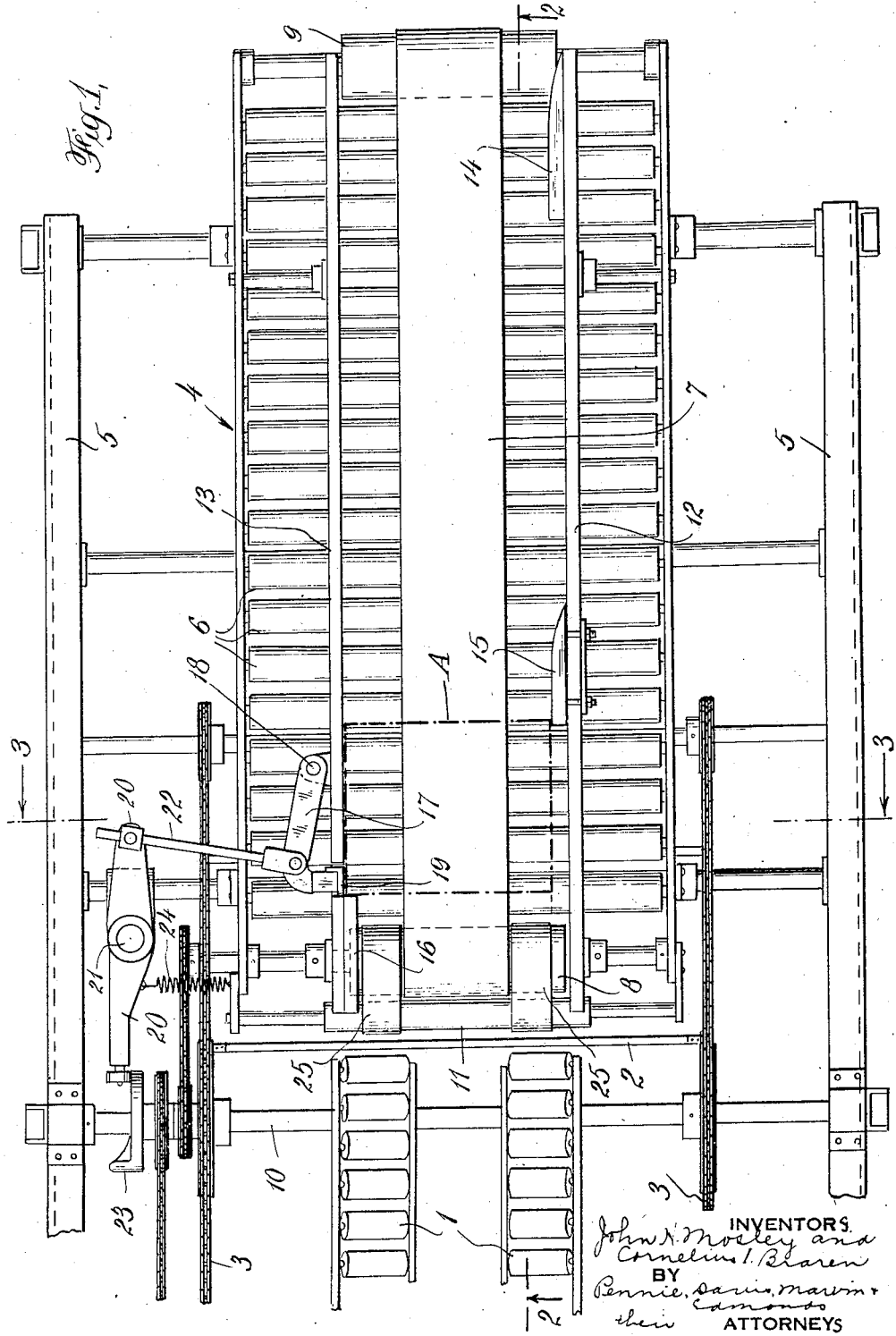

1,998,842

UNITED STATES PATENT OFFICE 1,998,842

ARTICLE-FEEDING MECHANISM

John H. Mosley, Jackson Heights, and Cornelius I. Braren, Jamaica, N. Y., assignors, by mesne assignments, to Standard-Knapp Corporation of New York Application December 11, 1930, Serial No. 501,497

7 Claims. (Cl. 198—20)

This invention relates to article feed mechanisms for carton sealing, package or article conveying or collecting, and other analogous machines.

In our standard carton sealing machine as now widely used for sealing fibreboard packing cases, and as exemplified in Patent No. 1,815,571 of Kimball and Rideout, patented July 21, 1931, a gravity feed system is provided for introducing the cartons into the machine. This feed mechanism comprises an inclined roller table having a stop near its lower end which is withdrawn from the path of the cartons in timed relation with the movement of the flights of the feed chains on the sealing machine, so that the cartons of their own weight will move down the inclined roller bed and onto the roller bed of the sealing machine in position to be engaged by the flights of the feed chain. The roller bed of the sealing machine is also inclined with the idea of insuring that the cartons in their descending movement down the roller bed of the feed chute will advance sufficiently into the sealing machine to be in advance of the flights of the feed chain.

This feed mechanism has been found satisfactory in practice and a large number of machines so equipped are now in daily use. Its operation, however, is effected by the weight of the cartons. Very heavily loaded cartons are apt to develop a considerable momentum in their passage down the roller bed of the feed table and enter the sealing machine at a velocity which is not altogether desirable.

When the cartons are very light in weight the gravity feed also may give trouble. If the rollers of the roller bed are insufficiently lubricated they develop too much friction, or if the carton gets slightly askew on the roller bed and engages the side guides the additional friction may stop the movement of the carton before it reaches a position in front of the flights of the feed chain, necessitating a stoppage of the machine and a hand adjustment of the particular carton before the operation can continue. As sealing machines of this kind are entirely automatic in their operation and are frequently installed where their operation cannot be readily observed by the attendants to the other machines in the packing room, it is highly desirable that these stoppages be prevented.

The invention of the present application is directed to a feed mechanism for carton sealing machines which is positive in its action and not affected by the weight of the carton. The feeding mechanism of the present application is equally suitable for feeding both light cartons and heavily loaded cartons, and in fact for cartons and articles of all sizes and descriptions.

The invention is also applicable to feed mechanisms for use with article conveyors where it is desirable to control the feeding or time the advance of articles by the conveyor.

In the accompanying drawings we have illustrated an embodiment of the invention particularly designed to be used in connection with our standard carton sealing machine disclosed in the prior patent above referred to.

In said drawings:

Fig. 1 is a plan view of our improved carton feeding mechanism and the adjacent portion of the carton sealing machine;

Fig. 2 is a vertical section on line 2—2 of Fig. 1; and

Fig. 3 is a transverse vertical section on line 3—3 of Fig. 1.

Referring to the drawings, 1 indicates the roller bed of the carton sealing machine on which the cartons are delivered by the gravity feed mechanism in our standard machine, and along which they are advanced by the flights 2 of the feed chain 3 through the flap-folding and pasting mechanism of the sealing mechanism (not shown here).

The feed chains 3 are operated continuously and the flights 2 are spaced apart on the chain the necessary distance for the successive cartons to be properly spaced in their movement through the sealing machine.

Our improved feed mechanism comprises a feed table 4 supported on the floor adjacent and in line with the carton sealing machine, and preferably maintained in fixed relation therewith by means of continuous longitudinal frame members 5 extending throughout the length of both the feed table and the sealing machine. The feed table has its upper surface formed of a series of rollers 6 underlying a feed belt 7 supported on pulleys 8 and 9 at the ends of the feed table, the pulley 8 being continuously driven through a sprocket chain operated from the shaft 10 of the feed chains 3 of the sealing machine.

The surface of the feed belt is substantially in the plane of the uppermost rollers of the roller bed 1 of the sealing machine and intermediate the feed belt and the roller bed is a supporting roller 11 onto which the cartons are projected by the movement of the feed belt. Adjustable side guides 12 and 13 are provided on each side of the feed belt at a suitable distance above the feed table, and these side guides are adjusted a distance apart somewhat greater than the width of the cartons to be sealed by the machine.

Side guide 12 is provided on its inner face with cam shoes or deflectors 14 and 15 adapted to engage the adjacent vertical edges of the cartons as they are fed along by the feed belt and shift the cartons laterally into close proximity to the side guide 13. Cam shoe 15 is made adjustable so that its position can be changed for cartons of different sizes. In Fig. 1 the cartons are illustrated at A and, as will be observed, the distance between the guides 12 and 13 is such as to provide just sufficient clearance between the inner faces of the cams attached to the guide 12 and the opposite face of the guide 13 for the cartons to move freely.

At the end of the guide 13 adjacent the sealing machine there is provided a fixed stop 16 against which the carton moving along closely adjacent the face of the guide 13, as necessitated by the cams 14 and 15, comes to rest.

A rock arm 17 is provided on a vertical pivot 18 on the guide 13 with its free end terminating just to the rear of the fixed stop 16, and attached to the free end of the rock arm is a pusher 19 adapted when the rock arm is in its outward position, to lie flush with the face of the guide 13 so that the advancing carton will move past the pusher into engagement with the fixed stop, in which position the pusher will lie in close proximity to the corner of the carton in engagement with the stop.

The pusher is operated periodically in timed relation with the flights 2 of the feed chain by means of a rocker 20 supported on a vertical shaft 21 connected by an adjustable link 22 with the rock arm carrying the pusher 19. The rocker 20 is actuated by a cam 23 mounted on the shaft of the feed chains 3 of the sealing machine, the rocker being held against the cam by means of a spring 24.

The operation of the device will now be described. The cartons to be sealed are delivered from the packing machines or packing tables to the feed belt resting on their folded, but unsealed, bottom flaps. The cartons may be closely adjacent on the feed belt, and as the line of cartons is advanced they will engage the cam shoes 14 and 15 and be shifted laterally into a position to certainly engage the fixed stop 16. The cam shoe 15 is adjusted so that the rear edge of the carton will not quite clear the end of the shoe when its front edge engages stop 16. At fixed intervals and once for each flight 2 of the feed chains 3, the pusher 19 is reciprocated to push the front edge of the carton in engagement with the fixed stop free of the stop 16 so that the carton may be advanced by the continued movement of the feed belt. The carton at this moment is somewhat askew on the belt, but as the carton is advanced between the stop 16 and guide 12 it will be brought back into substantial alignment. If the cam shoe 15 were not adjusted to engage the rear of the carton, the continued movement of the belt after the front edge of the carton engaged the stop 16 would tend to shift the carton laterally and possibly cause it to become free of the stop 16 before the pusher 19 came into operation. The cam for operating the pusher 19 is so shaped and proportioned as to be drawn back flush with the face of the side guide 13, while the first carton in line is still passing the stop, thus leaving the stop free to engage the second carton in line.

In the meantime, the carton which has been shifted clear of the stop has been positively advanced by the feed belt into position such that its major portion overlies the roller bed 1 of the sealing machine onto which it will tip by gravity and descend in time to be clear of the flights, the next carton in line being positively stopped by the fixed stop and there held until in the properly timed operation of the machine it is released to be engaged by the next succeeding flight on the feed chains.

If the carton is advanced against the rear edge of the pusher 19 while the latter is projected under the influence of the cam 23, the pusher will serve to stop the carton temporarily, but upon the withdrawal of the pusher, the operation will proceed as described above.

With this apparatus the operation is substantially the same with light and heavy cartons. The heavy cartons gain no substantial momentum because the major portion of the feeding movement into the sealing machine is in a horizontal plane by means of the feed belt which is moving at a fixed rate of speed. The carton does not begin to move down the incline until it is fed forward sufficiently to tilt over onto the roller table and before it can again gain any substantial momentum it has reached the level portion of the roller bed where it will be engaged by the flight and its movement continued in unison with the movement of the feed chains.

Cartons of lighter weight will be positively fed by the belt at the same rate as the heavier cartons. If on being tilted onto the roller table they do not move down the table with sufficient velocity to clear the flight, the flight coming up between the roller 6 and the end of the roller table will lift the rear edge of the carton, thereby increasing its tendency to move down the roller bed.

If desired, the roller 11 may be positively driven from the pulley 8 by means of supplemental feed belts 25 lying on each side of the main feed belt, so that the positive feed of the carton will carry all but its rearmost corner onto the roller bed, thus insuring that the carton will be properly engaged by the flights 3.

We have selected for illustration the preferred embodiment of our invention which has been found satisfactory in practice, but it is to be understood that the invention is not limited to the details of construction except insofar as defined in the appended claims.

Although we have illustrated our invention in connection with a conveyor which is adapted and combined with a sealing machine for sealing the flaps of fibreboard packing cases, or cartons, so as to properly feed the cartons to this sealing machine, it will be understood that the invention is also susceptible of use in connection with conveyors of other types. For example, the invention can be used to advantage in connection with conveyors which form parts of package-collecting machines, such as are employed in manufacturing establishments to collect the manufactured product from the machine which performs the last operation in the finishing of the individual articles for market (usually labeling or wrapping) and bringing them together in predetermined sequence for packing in shipping cases, or cartons.

We claim:

1. In a mechanism of the class described, the combination of means for advancing an article, a fixed stop positioned to be engaged by the front of the advancing article adjacent one corner thereof, and means operated periodically to turn the article with respect to said advancing means to release it from engagement with said fixed stop into position to be again advanced by said means.

2. In a mechanism of the class described, the combination of means for advancing an article, a fixed stop positioned to be engaged by the front of the advancing article adjacent one corner thereof, means for positively directing said article into engagement with said stop, and means operated periodically to turn the article with respect to said advancing means to release it from engagement with said fixed stop into position to be again advanced by said means.

3. The combination with a machine having an inclined feed table, of means for feeding articles to said table comprising a continuously driven feed belt arranged with its delivery end in close proximity to the upper end of said inclined feed table, fixed guides extending alongside said feed belt and spaced apart a distance greater than the width of said article, means for guiding said articles along one of said guides, a fixed stop positioned to be engaged by articles so advanced by said feed belt, and means for periodically shifting the articles out of engagement with said stop into position to be positively advanced by said feed belt onto said inclined table.

4. The combination with a machine having a receiving table, of means for feeding articles to said table comprising a continuously driven feed belt, fixed guides extending alongside said feed belt and spaced apart a distance greater than the width of said article, means for guiding said articles along one of said guides, a fixed stop positioned to be engaged by said articles so advanced by said feed belt, and means for periodically shifting the articles out of engagement with said stop into position to be positively advanced by said feed belt onto said receiving table.

5. In a machine of the class described, the combination of means for advancing articles, fixed guides extending alongside said means and spaced apart a greater distance than the width of said articles, a deflector for urging said articles into proximity with one of said guides, a fixed stop positioned to be engaged by the front of said articles so advanced, the front end of said deflector being so positioned that the rear edge of the article will not quite clear the same when its front edge engages said stop, and means for periodically shifting the front of said articles out of engagement with said stop so as to allow them to be carried along by said advancing means.

6. In a mechanism of the class described the combination of means for advancing an article, article-arresting means comprising a fixed stop for engaging a front corner of the article and a member positioned to engage the diagonally opposite side corner of the article, and means operated periodically to release said front corner of the article from said fixed stop so as to allow the article to be again advanced by said advancing means.

7. In a machine of the class described, the combination of means for advancing articles, fixed guides extending alongside said means and spaced apart a greater distance than the width of said articles, a deflector for urging said articles into proximity to one of said guides, a fixed stop positioned to be engaged by the front of said articles so advanced, and means operated periodically to turn the articles with respect to said advancing means to release them from engagement with said stop into position to be again carried along by said advancing means.

JOHN H. MOSLEY.
CORNELIUS I. BRAREN.